April 13, 1926.
F. W. SPERR, JR
RECOVERY OF HYDROGEN SULPHIDE
Original Filed Dec. 8, 1921
1,580,452
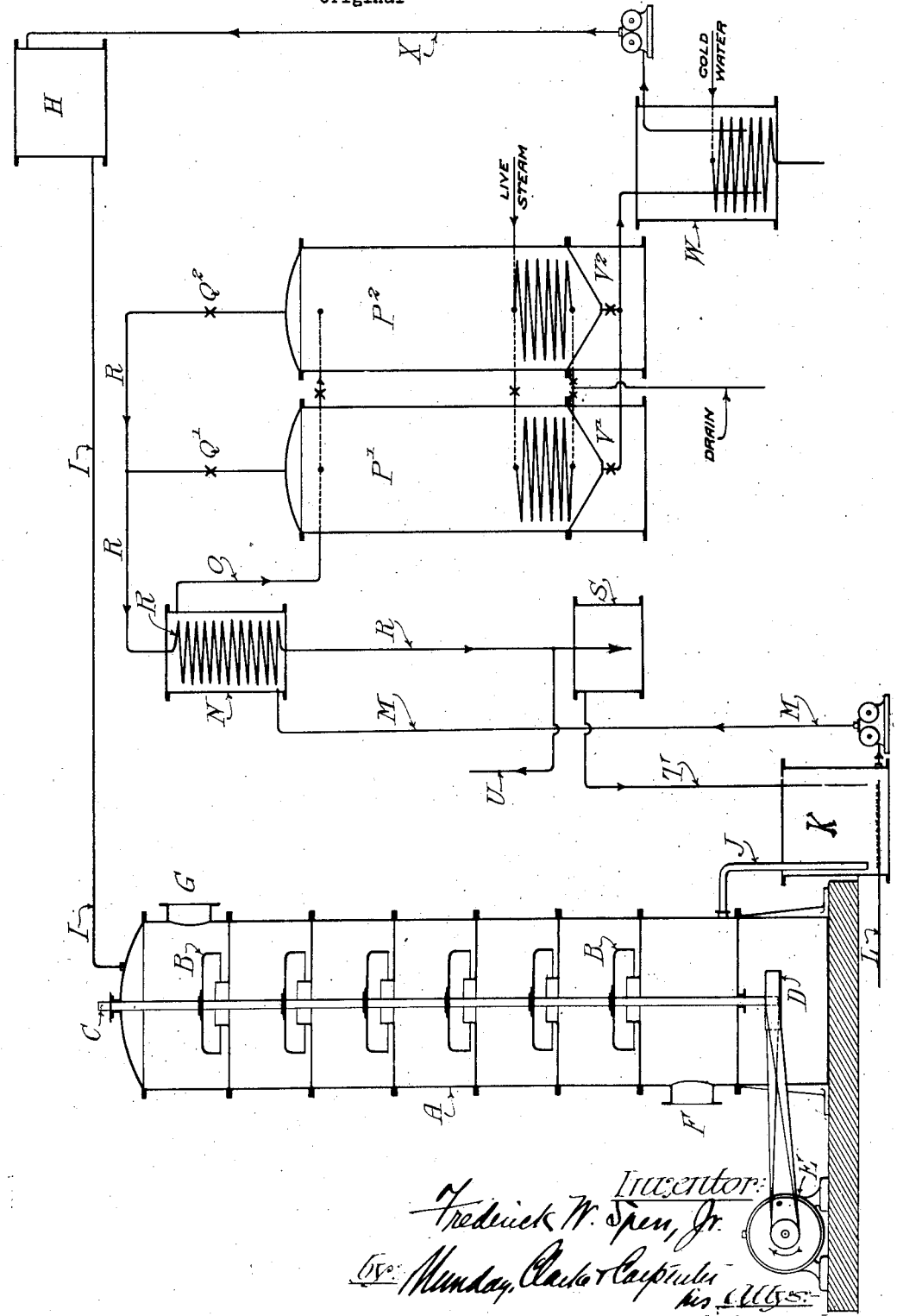

Patented Apr. 13, 1926.

1,580,452

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

RECOVERY OF HYDROGEN SULPHIDE.

Application filed December 8, 1921, Serial No. 520,810. Renewed July 3, 1925.

*To all whom it may concern:*

Be it known that I, FREDERICK W. SPERR, Jr., a citizen of the United States, residing in Pittsburgh, in the county of Allegheny and State of Pennsylvania, have invented a new and useful Improvement in Recovery of Hydrogen Sulphide, of which the following is a specification.

This invention relates to the manufacture of hydrogen sulphide and has for an object to produce concentrated or substantially pure hydrogen sulphide from gases which contain it. The process of the invention is especially applicable to the treatment of gases which contain but moderate amounts of carbon dioxide in proportion to the hydrogen sulphide content. A typical example of such gases is the gas produced in the distillation and cracking of petroleum, as this gas may contain 5% or more of hydrogen sulphide by volume, but very little or no carbon dioxide. The process is, however, also applicable to the treatment of other gases, such as coke oven gas, produced or treated in such a manner as to have a relatively moderate content of carbon dioxide. It is a purpose of the invention to treat gases, such as those above mentioned, in such a way as to remove part or all of their hydrogen sulphide content and to recover the thus removed hydrogen sulphide in a concentrated form, so that it may be employed for any desired purpose, for example, for the manufacture of sulphuric acid.

In addition to the general objects recited above, the invention has for further objects such other improvements or advantages in operation or results as are found to obtain in the apparatus and processes hereinafter described or claimed.

In the accompanying drawing, forming a part of this specification and showing, for purposes of exemplification, a preferred form and manner in which the invention may be embodied and practiced, but without limiting the claimed invention specifically to such illustrative instance:

The figure illustrates a diagrammatic representation of apparatus for carrying out the improved process of the present invention.

In carrying out the invention, there is employed a suspension of alkaline earth hydroxides or sulphides, the principle involved in the treatment of the gas being the same in each case as will be understood from the ensuing description. Calcium hydroxide $(Ca(OH)_2)$ and calcium sulphide (CaS) may be taken as examples of material suitable for carrying out the process; however, it will be understood that the hydroxides and sulphides of magnesium, barium, and strontium may also be employed. Calcium and magnesium compounds have the advantage of cheapness.

The process is of especial advantage in application to gases low in carbon dioxide but is not necessarily limited to such gases. In fact, it is well suited to the treatment of gases containing moderate amounts of carbon dioxide. The carbon dioxide acts upon the calcium hydroxide or sulphide forming calcium carbonate which is practically insoluble and inert and does not interfere either with the removal of hydrogen sulphide or its recovery in a substantially pure form.

Calcium hydroxide and calcium sulphide have rather low solubility in water, but readily form suspensions which react readily with hydrogen sulphide. The calcium hydroxide suspension is ordinary milk of lime. If a calcium hydroxide suspension be brought into contact with gas containing hydrogen sulphide, the following reaction occurs:

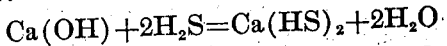
$$Ca(OH)_2 + 2H_2S = Ca(HS)_2 + 2H_2O$$

When the resulting suspension is heated, two reactions occur. The calcium hydrosulphide $(Ca(HS)_2)$ first decomposes into the sulphide (CaS), as follows:

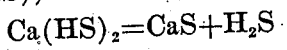
$$Ca(HS)_2 = CaS + H_2S$$

Part of the calcium sulphide is further decomposed into the hydroxide as follows:

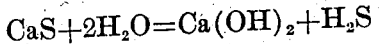
$$CaS + 2H_2O = Ca(OH)_2 + H_2S$$

In both reactions, hydrogen sulphide is evolved. The resulting suspension, after heating, may consist almost entirely of calcium sulphide or may be a mixture of sulphide and hydroxide, depending upon the extent to which the heating has been carried.

In any case, the suspension when cooled may be used to absorb hydrogen sulphide from additional quantities of gas, the calcium hydroxide reacting with the hydrogen sulphide in the manner described above, and the calcium sulphide reacting as follows:

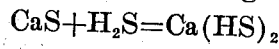

$$CaS + H_2S = Ca(HS)_2$$

In accordance with the invention, there is thus developed a continuous cyclic process for the removal of hydrogen sulphide from gas, with recovery of the hydrogen sulphide in concentrated form. In carrying out such a process the gas may be treated with calcium hydroxide, calcium sulphide or a mixture of both, in suspension in water. The suspension containing the absorbed hydrogen sulphide may then be heated to cause it to give up the hydrogen sulphide and to regenerate the suspension for further absorption of hydrogen sulphide. After heating the regenerated suspension is cooled and recirculated to bring it again in contact with the hydrogen sulphide bearing gas. Any loss of material, whether mechanically or through secondary reactions, such as the formation of calcium carbonate, may be made up by adding to the system either calcium sulphide, calcium hydroxide or both.

The accompanying drawing illustrates diagrammatically one arrangement of apparatus for carrying out the process, although it will be understood that many modifications and many other arrangements of apparatus may be employed. The gas containing hydrogen sulphide may be treated in a rotary gas scrubber A which is especially adapted for the treatment of gas with suspensions or emulsions. A scrubber of this type embodies a casing divided into compartments by trays having central openings, with rotating bells B in each compartment which are attached to the shaft C, the latter being driven through the power connection D by a motor E. The gas containing hydrogen sulphide enters the bottom of the scrubber through the pipe F and passes through the different compartments, in countercurrent to the suspension, and emerges through the pipe G. The suspension (such as a water suspension of calcium hydroxide) is drawn from the supply tank H through the pipe line I and discharges into the top compartment of the scrubber. Suspensions of different strengths may be employed; a satisfactory suspension, however, is 5 parts by weight of calcium hydroxide to 100 parts by weight of water. The suspension containing the absorbed hydrogen sulphide flows out of the scrubber through the pipe J into the tank K. Here it may be kept in agitation by air or steam blown through the pipe L. From the tank K, the suspension is pumped through the line M into the preheater N where it is heated by the steam and gases from the evaporators. The preheated suspension then flows through the line O into one of the two evaporators $P_1$ and $P_2$. These may be of continuous or intermittent type. Intermittent operation will be described here.

The suspension is pumped into evaporator $P_1$ until this is full and then into $P_2$. The first evaporator is heated to the boiling point and hydrogen sulphide is rapidly evolved, passing through the pipe $Q_1$ into the line R which is connected with a coil in the preheater N. The cooling effect of the preheater may be supplemented by a condenser in which the vapors are further cooled by fresh air. The steam is condensed and the condensate, carrying a little hydrogen sulphide, runs into the tank S, from which the condensate may be returned through the line T to the tank K. The bulk of the hydrogen sulphide passes out through the line U and may be utilized as desired, e. g., for the manufacture of sulphuric acid or sulphur.

When the contents of the evaporator $P_1$ have been sufficiently heated so that all of the calcium hydrosulphide is decomposed to form calcium sulphide together with some hydroxide, the heating is discontinued and the valve in the line $Q_1$ is closed. Valve $V_1$ is opened and the contents of the evaporator are allowed to drain into the cooling tank W, provided with cooling coils through which water is circulated. The contents of this tank are preferably kept in agitation by air or by mechanical means. In other arrangements, the hot suspension from the evaporator may be used to assist in preheating the suspension going to the evaporators.

In the meantime, evaporator $P_2$ will be filled and heated, the hydrogen sulphide and steam passing out through the line $Q_2$. The operations of filling, heating and emptying are conducted alternately in the two evaporators. It is advantageous to employ vacuum in the operation of heating since the removal of hydrogen sulphide is greatly facilitated thereby. Steam directly injected into the contents of the evaporator also assists in accelerating the reactions. The expulsion of hydrogen sulphide from the suspension during the heating may also be facilitated by passing air or other gases through the suspension in the heating apparatus.

From the cooling tank W, the suspension is pumped through the line X to the tank H from which it is circulated again over the gas in the scrubber A. As the suspension diminishes in efficiency through the formation of calcium carbonate or otherwise, part of it may be periodically removed from the system and replaced by fresh calcium hydroxide added to tank W. Calcium sulphide may be employed instead of calcium hydroxide for this purpose.

The invention as hereinabove set forth may be variously embodied within the scope of the claims hereinafter made.

I claim:

1. The process of producing hydrogen sulphide, which consists in: passing a hydrogen-sulphide bearing gas into contact with a suspension of calcium hydroxide and calcium sulphide to absorb the hydrogen sulphide from the gas; then subjecting the suspension containing the absorbed hydrogen sulphide to a preheating operation; then heating the preheated suspension to expel the hydrogen sulphide and to regenerate the suspension; the liberated vapor being employed for preheating the suspension going to the heating operation; and cooling the regenerated suspension and passing it back to the gas treatment stage; substantially as specified.

2. The process of producing hydrogen sulphide, which consists in: passing a hydrogen-sulphide bearing gas into contact with a suspension of calcium hydroxide to absorb the hydrogen sulphide from the gas; then subjecting the suspension containing the absorbed hydrogen sulphide to a preheating operation; then heating the preheated suspension to expel the hydrogen sulphide and to regenerate the suspension; the liberated vapor being employed for preheating the suspension going to the heating operation; and cooling the regenerated suspension and passing it back to the gas treatment stage; substantially as specified.

3. The process of producing hydrogen sulphide, which consists in: passing a hydrogen-sulphide bearing gas into contact with a suspension of calcium compound having an alkaline reaction to absorb the hydrogen sulphide from the gas; then subjecting the suspension containing the absorbed hydrogen sulphide to a preheating operation; then heating the preheated suspension to expel the hydrogen sulphide and to regenerate the suspension; the liberated vapor being employed for preheating the suspension going to the heating operation; and cooling the regenerated suspension and passing it back to the gas treatment stage: substantially as specified.

4. The process of producing hydrogen sulphide, which consists in: passing a hydrogen-sulphide bearing gas into contact with a suspension of an alkaline earth compound having an alkaline reaction to absorb the hydrogen sulphide from the gas; then subjecting the suspension containing the absorbed hydrogen sulphide to a preheating operation; then heating the preheated suspension to expel the hydrogen sulphide and to regenerate the suspension; the liberated vapor being employed for preheating the suspension going to the heating operation; and cooling the regenerated suspension and passing it back to the gas treatment stage; substantially as specified.

5. The process of producing hydrogen sulphide which consists in: passing a hydrogen-sulphide bearing gas into contact with a suspension of calcium hydroxide to absorb the hydrogen sulphide from the gas; and then subjecting the suspension containing the absorbed hydrogen sulphide to a heating operation to liberate the hydrogen sulphide and to regenerate the suspension for further absorption of hydrogen sulphide from gases; substantially as specified.

6. The process of producing hydrogen sulphide which consists in: passing a hydrogen-sulphide bearing gas into contact with a suspension of calcium compound having an alkaline reaction to absorb the hydrogen sulphide from the gas; and then regenerating the suspension containing the absorbed hydrogen sulphide for further absorption of hydrogen sulphide by subjecting said suspension to a heating operation to liberate the absorbed hydrogen sulphide; substantially as specified.

7. The process of producing hydrogen sulphide which consists in: passing a hydrogen-sulphide bearing gas into contact with a suspension of alkaline earth compound having an alkaline reaction to absorb the hydrogen sulphide from the gas; and then regenerating the suspension containing the absorbed hydrogen sulphide for further absorption of hydrogen sulphide by subjecting said suspension to a heating operation to liberate the absorbed hydrogen sulphide; substantially as specified.

In testimony whereof I have hereunto set my hand.

FREDERICK W. SPERR, Jr.